United States Patent
Swaminathan et al.

(10) Patent No.: US 7,595,366 B2
(45) Date of Patent: Sep. 29, 2009

(54) N-POLY(ALKENYL) ACRYLAMIDES AND PROCESS FOR PREPARATION THEREOF

(75) Inventors: Sivaram Swaminathan, Maharashtra (IN); Jogimarappagari Y. Mallinamadugu, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 11/195,679

(22) Filed: Aug. 3, 2005

(65) Prior Publication Data

US 2006/0052562 A1    Mar. 9, 2006

Related U.S. Application Data

(62) Division of application No. 10/934,748, filed on Sep. 7, 2004, now abandoned.

(51) Int. Cl.
*C08F 120/56* (2006.01)
(52) U.S. Cl. .................. 525/244; 526/303.1
(58) Field of Classification Search .......... 526/303.3, 526/303.1; 525/244
See application file for complete search history.

(56) References Cited

U.S. PATENT DOCUMENTS

| | | | |
|---|---|---|---|
| 2,573,673 A | 10/1951 | Ritter | |
| 3,151,157 A | 9/1964 | Fugate et al. | |
| 3,161,679 A | 12/1964 | D'Errico et al. | |
| 3,170,951 A | 2/1965 | Sheers et al. | |
| 3,317,589 A | 5/1967 | Vitalis et al. | |
| 4,395,524 A | 7/1983 | Emmons et al. | |

FOREIGN PATENT DOCUMENTS

| | | | |
|---|---|---|---|
| EP | 0004362 A2 | 10/1979 | |
| GB | 1103876 | 2/1968 | |

OTHER PUBLICATIONS

Clarke et al., "Application of the Ritter Reaction to .Alpha.—Olefins", Journal of the American Oil Chemists' Society, 41(1), 78-82 Doden:JAOCA7;ISSN: 0003-021X, 1964, XP009048098.
International Search Report.
Khalistova et al., Osnov. Organ. Sintez i Neftekhimiya Yaroslavl 22:40-44 (1986).
Rahimi "Synthesis of N-alkyl amides based on unsaturated aliphathic nitriles and α-olefins" Issled. Ochistka Nefteprod. Ispol'z. Ikh Protsessakh Neftepererab. Neftekhim pp. 38-46 (1983).
Rakhimi et al., Azerbaidzhanskii Khimicheskii Zhurnal 5:62-64 (1982).
International Search Report for Int'l Appln. No. PCT/IB2004/002893 (2005).
Written Opinion for Int'l Appln. No. PCT/IB2004/002893 (2005).

*Primary Examiner*—Helen L. Pezzuto
(74) *Attorney, Agent, or Firm*—Nixon & Vanderhye P.C.

(57) ABSTRACT

The present invention relates to novel N-Poly (alkenyl) acryl amides of formula (1) where in m=1-8, n=2-100

$$H_2C=C(H)-C(=O)-N(H)-C(CH_3)(CH_2-(CH_2)_m-H)-CH_2-[C(H)(CH_2-(CH_2)_m-H)-CH_2]_n-$$

Formula (1)

and to a process for preparation thereof and process for preparation thereof by reacting an unsaturated poly(olefin) of the formula $C_nH_{2m}$ where n and m are as given above with acrylonitrile in presence of an acid catalyst.

18 Claims, No Drawings

N-POLY(ALKENYL) ACRYLAMIDES AND PROCESS FOR PREPARATION THEREOF

RELATED APPLICATION

This application is a divisional of U.S. application Ser. No. 10/934,748, filed Sep. 7, 2004 abandoned.

FIELD OF THE INVENTION

The present invention relates to novel N-Poly (alkenyl) acryl amides and process for preparation thereof. More particularly, the present invention relates to a process of preparation of N-poly(alkenyl) acryl amides of formula (1) where in m=1-8, n=2-100

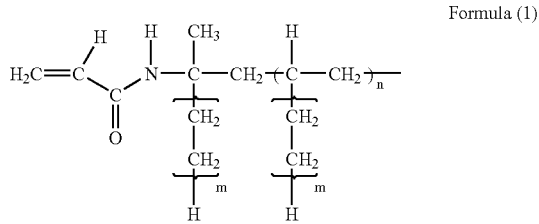

Formula (1)

BACKGROUND OF THE INVENTION

N-alkylacrylamides, such as N-isopropyl, N-tert-butylacrylamide and N-n-octylacrylamide, are of important classes of monomers for the synthesis of polymers, which are useful in applications such as sizing agents, rheology modifiers and water soluble polymers. Amongst these, N-isopropylacrylamide has assumed significant importance owing to the commercial importance of its polymer. Poly(N-isopropylacrylamide) has been widely studied for its novel thermal behaviour in aqueous media [Schild H G. *Progress in Polymer Science.* 17, 163 (1992)] and possesses inverse solubility upon heating, a property contrary to the behaviour of most polymers in organic solvents under atmospheric pressure near ambient temperature. Its macromolecular transition from a hydrophilic to hydrophobic structure occurs at what is known as lower critical solution temperature (LCST). Experimentally, this temperature lies between 30-35° C., the exact temperature being a characteristic of the microstructure of the polymer. At molecular level, poly(N-isopropylacrylamide) has been used in many forms including single chain, macroscopic gel, microgels, latex, thin film, membrane, coating, and fibres.

N-alkylacrylamides (alkyl=$C_6$ to $C_{18}$) are also widely used as comonomers for the preparation of hydrophobically modified polyelectrolytes [Glass J E, *Polymers in aqueous media: performance through association.* ACS symposium series, 223. Washington: American Chemical Society, 1989 and Shalaby S W, McCormick C L, Glass J E. In: Shalaby S W, McCormick C L, Glass J E, editors. *Water soluble polymers: synthesis, solution properties and applications.* ACS symposium series 467. Washington: American Chemical Society, 1991]. These polymers consist of a water-soluble backbone containing a small proportion of hydrophobic groups (<3 mol %) usually in the form of pendant side chains or terminal groups. In aqueous solution the hydrophobic groups aggregate to minimize their exposure to water and, thereby, form hydrophobic microdomains in a fashion analogous to that of surfactants above their critical micelle concentration. Above a certain concentration ($C_{ag}$), intermolecular hydrophobic interactions lead to the formation of a three dimensional network of polymer chains resulting in an increase in the apparent molecular weight and, consequently, a substantial viscosity enhancement.

Copolymers of N-alkylacrylamides with various other monomers are also finding diverse applications. For example, poly(N-dodecylacrylamide-co-N-methyl-4-vinyl pyridinium Na) is reported to be a useful as salt resistant viscosity builder [D. Christine, B. Alain and L. Pierre, *Macromol. Symp.* 102, 233 (1995), D. Christine, B. Alain, B. Fransis and V. M. Laure, *Polymer* 36, 2095 (1995)], poly (N-stearoyl acrylamide-co-2-(3-acrylamidopropyl) dimethyl aminoethyl isoproply phosphate) is used as phosphatidylcholine analogous material [W Yenfeng, C. Tianming, K. Masaya and N. Taiao, *J. Polym. Sci. Chem. Edn.* 34, 449 (1996)], poly (N-tert-octylacrylamide-co-N-alkylacrylamide) has been employed as a thickener in cosmetics [J. Mondet and B. Lion Eur. Pat. Appl. EP 494,022] and poly (N-octylacrylamide-co-3-acrylamido-3-methyl butanoate Na) has been used for for oil recovery applications [A. Kitagawa and T Koichi, Jpn. Kokai Tokkyo Koho JP 07,188,347].

N-alkylacrylamides are, thus, a useful class of monomers. In order to meet the growing demand and new applications of N-alkylacrylamides, various methods have been developed for their synthesis.

Some of these methods for the synthesis of N-alkylacrylamides include (1) reaction of acryloyl chloride with alkyl amine; (2) pyrolysis or thermal decomposition of carboxylic acid amides, and (3) reaction of iso-olefins with nitriles.

In the first method N-alkylacrylamides are prepared by reacting acryloyl chloride with the corresponding alkyl amines in the presence of an acid quencher i.e. triethyl amine at 0° C. [C. G. Overberger, C. Frazier and J. Mandehman, *J. Am. Chem. Soc.* 75, 3326 (1953), J. Lal and G. S. Trick, *J. Polym. Sci. A*2, 4559 (1964), E. F. Jr. Jordan, G. R. Riser and B. Artymyshyn, *J. Appl. Polym. Sci.* 13, 1777 (1969), K. J. Shea, G. J. Stoddard, D. M Shavelle, F. Wakui and R. M. Chaote, *Macromolecules* 23, 4497 (1990)].

In the second method N-alkylacrylamides are prepared by amidation of bicyclic carboxylic acids followed by the thermal decomposition of the carboxamide. For example, the reaction of dimethylamine with bicyclo [2.2.1]hept-2-ene-2-carboxylic acid in an autoclave gave N,N-dimethyl bicyclo [2.2.1]hept-2ene-2-carboxylic acid which was subjected to thermal decomposition at 200° C./vacuum to give N,N-dimethyl bicyclo [2.2.1]hept-2-ene-2-carboxamide [A. Ohshima and K. Tsubashima Jpn. Tokkyo Koho 7909 170, A. Oshima, K. Tsubashima and N. Takahashi Ger. Offen. 2,217,623].

In method (3) N-alkylacrylamides are prepared by reacting acrylonitrile with various iso-olefins. It is also known to synthesise N-tert-octylacrylamide by reacting acrylonitrile with 2,4,4-trimethyl-1-pentene at 40° C. for 3 hours using 65% $H_2SO_4$ as solvent [T Takada, Y Kawakatsu, T Mihamisawa and K Hara, Japan Kokai-7391011].

A method for the preparation of N-alkylamides using 60% $H_2SO_4$ and cation exchange resin as catalysts have been disclosed [S. Sivaram, N. Kalyanam, Ind. pat. 158395 A and S. Sivaram, N. Kalyanam Ind. Pat. 158038].

The above methods are beset with many disadvantages. Method (1) cannot be used for preparation of higher N-alkyl acrylamides (where alkyl chain length>C18) as alkylamines with>18 carbon atoms are not readily available. Besides, the method uses acryloyl chloride, which is an expensive and hazardous reagent and requires disposal of large quantities of chloride as waste.

Methods of type (2) suffer from the drawbacks of high temperatures, high vacuum and tedious work up procedures. This method is also applicable generally to only alkyl amides with small alkyl chain lengths. The reaction of olefins with nitriles is the most suitable general method for the synthesis of N-alkyl acrylamides and has been widely practiced. However, this method is restricted by the availability of suitable iso-olefins (isobutylene, 2,4,4-trimethyl-1-pentene etc) with carbon numbers less than eight or twelve.

It is therefore important to devise methods for the synthesis of N-alkylacrylamides which overcome the disadvantages of the prior art discussed above as well as create new N-alkylacrylamides in view of their growing importance in various fields of technology.

OBJECTS OF THE INVENTION

The main object of the invention is to provide a method for the preparation of N-poly(alkenyl) acrylamides which overcomes the disadvantages of prior art discussed above.

It is another object of the invention to provide novel N-poly (alkenyl) acrylamides with a wide range of applications.

SUMMARY OF THE INVENTION

Accordingly, the present invention provides novel N-poly (alkenyl) acrylamides having formula (I)

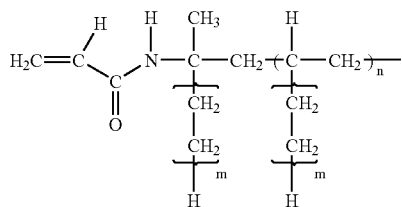

Formula (1)

wherein m=1-8, n=2-100.

The compounds of formula (1) are obtained by the reaction of an unsaturated poly(olefin) of the formula $C_nH_{2m}$ where n=2-200 and m=1-8, with acrylonitrile in presence of an acid catalyst.

The present invention also provides a process for the preparation of N-poly(alkenyl) acrylamides of formula (1)

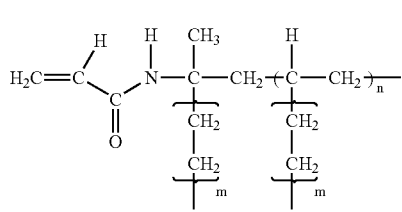

Formula (1)

wherein m=1-8, n=2-100, which comprises reacting a vinylidene terminated poly(α-olefin) with acrylonitrile in presence of an acid catalyst at 50-75° C., in a solvent if Mn<1000, and for a period ranging between 1-12 hours to obtain the desired product and separating the product from the reaction mixture.

In one of the embodiments of the present invention, vinylidene terminated poly(α-olefin) has a general formula $C_nH_{2m}$ wherein m=1-8, n=2-100 and are prepared by the polymerization of α-olefins using an organometallic catalyst system.

In another embodiment of the present invention, the acid catalyst includes but not limited to dilute sulfuric acid, dilute phosphoric acid, dilute hydrochloric acid and mixtures of concentrated sulfuric acid (98%) and acetic acid.

In yet another embodiment a solvent may be needed if Mn<1000.

In a feature of the present invention, the convention method used for separating the product is filtration.

Yet another embodiment of the invention involves preparation of N-poly(alkenyl) rylamides a polymerizable macromonomer, containing a hydrophobic alkyl group and a drophilic amide group in the same molecule.

DETAILED DESCRIPTION OF THE INVENTION

The present invention provides novel N-poly(alkenyl) acrylamides having formula (I)

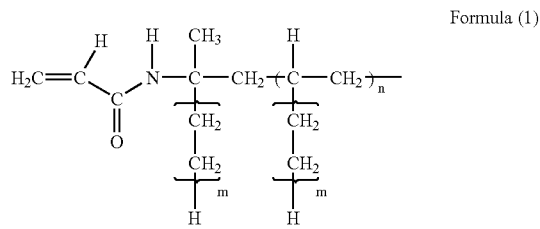

Formula (1)

wherein m=1-8, n=2-100. In accordance with the process of the invention, the compounds of formula (1) are obtained by the reaction of an unsaturated poly(olefin) of the formula $C_nH_{2m}$ where n=2-200 and m=1-8, with acrylonitrile in presence of an acid catalyst. The process of the invention comprises reacting a vinylidene terminated poly(α-olefin) with acrylonitrile in presence of an acid catalyst at 50-75° C., in a solvent if the Mn of the polyolefin is <1000, and for a period ranging between 1-12 hours to obtain the desired product and separating the product from the reaction mixture. The preferred method of separation is by filtration.

The vinylidene terminated poly(α-olefin) has a general formula $C_nH_{2m}$ where m=1-8 and n=2-100 and are prepared by the polymerization of α-olefins using an organometallic catalyst system.

The acid catalyst used in the process of the invention includes but is not limited to dilute sulfuric acid, dilute phosphoric acid, dilute hydrochloric acid and mixtures of concentrated sulfuric acid (98%) and acetic acid. As explained above if the Mn of the polyolefin is <1000, a solvent such as chlorobenzene is used.

The N-poly(alkenyl) acrylamides contains a hydrophobic alkyl group and a hydrophilic amide group in the same molecule.

The process for the present invention is described herein below with examples which are illustrative and should not be construed to limit the scope of the invention in any manner.

All manipulations with the metallocene catalysts were carried out in a glove box under nitrogen, and high vacuum techniques were used where appropriate. Oligomerization of hexene-1 used in the examples was carried out using $Cp_2ZrCl_2$/MAO catalyst at different temperatures according to prior art methods (carbon numbers 20-500). Oligomers of poly(hexene-1) with Mn varying from 500-10000 were obtained with variation in polymerization temperature from 50 to −20° C. The number average molecular weight of poly (1-olefin) was measured by VPO as well as from NMR. The number average degree of Functionality (Fn) of terminally unsaturated poly(1-olefin) was measured by the ratio of the number average molecular weight of poly(1-olefin) from VPO by the number average molecular weight of poly(1-olefin) from NMR.

The reaction of vinylidene terminated poly(hexene-1) with acrylonitrile was carried out by a solvent free method for low molecular weight oligomers (Mn<1000). However, for higher molecular weight polymers, the reaction was carried out in chlorobenzene.

The number average degree of Functionality (Fn) of N-poly(alkenyl) acrylamide was measured by the ratio of the number average molecular weight (Mn) of N-poly(alkenyl) acrylamide from VPO by the number average molecular weight of N-poly(alkenyl) acrylamide measured by $^1$H NMR. Structural analysis was carried out by both $^1$H and $^{13}$C NMR. The peaks due acrylamide group were observed at 6.2, 5.5 and 5.2 ppm for the corresponding protons of $CH_2$, CH and NH respectively in $^1$H NMR.

EXAMPLE-1

A two necked round bottom flask, fitted with a dropping funnel and reflux condenser was charged with 5.2 g (0.1 mol) of acrylonitrile and 70% $H_2SO_4$ (2 mL) at room temperature. After the addition, temperature was increased to 75° C., followed by addition of 3.8 g (0.01 mol) of liquid oligomer of poly(hexene-1) (Mn=380) from dropping funnel. The addition was continued for a period of 1 hour. After the addition, the reaction was continued for a period of 12 hours. The reaction was worked up by addition of 10-15 mL of distilled water and both organic and aqueous layers were transferred into a separating funnel. The product was extracted with diethyl ether to obtain a yield of 4.2 g of a viscous liquid. The number average molecular weight analysis of the product by VPO showed a value of 440. The number average degree of functionality (Fn) was found to be 90 mol %.

EXAMPLE-2

A two necked round bottom flask, fitted with a dropping funnel and reflux condenser was charged with 5.2 g (0.1 mol) of acrylonitrile and 70% $H_2SO_4$ (2 mL) at room temperature. After the addition, temperature was increased to 75° C., followed by addition of 5.5 g (0.01 mol) of liquid oligomer of poly(hexene-1) (Mn=550) from dropping funnel. The addition was continued for a period of 1 hour. After the addition, the reaction was continued for a period of 12 hours. The reaction was worked up by addition of 10-15 mL of distilled water and both organic and aqueous layers were transferred into a separating funnel. The product was extracted with diethyl ether to obtain a yield of 6.0 g of a viscous liquid. The number average molecular weight analysis of the product by VPO showed a value of 630. The number average degree of functionality was calculated as 85 mol %.

EXAMPLE-3

A two necked round bottom flask, fitted with a dropping funnel and reflux condenser was charged with 2.6 g (0.05 mol) of acrylonitrile and 70% $H_2SO_4$ (2 mL) at room temperature. After the addition, temperature was increased to 75° C., followed by addition of 5.0 g (0.005 mol) of liquid oligomer of poly(hexene-1) (Mn=1000) from dropping funnel. The addition was continued for a period of 1 hour. After the addition, the reaction was continued for a period of 12 hours. The reaction was worked up by addition of 10-15 mL of distilled water and both organic and aqueous layers were transferred into a separating funnel. The product was extracted with diethyl ether to obtain a yield of 5.4 g of a viscous liquid. The number average molecular weight analysis of the product by VPO showed a value of 1080. The number average degree of functionality (Fn) was found to be 80 mol %.

EXAMPLE-4

A two necked round bottom flask, fitted with a dropping funnel and reflux condenser was charged with 2.6 g (0.05 mol) of acrylonitrile and 70% $H_2SO_4$ (2 mL) at room temperature and temperature was increased to 75° C. Approximately 9.9 g (0.0055 mol) of liquid oligomer of poly(hexene-1) (Mn=1800) dissolved in 50 mL of chlorobenzene (as it was not free flowing liquid) was added drop wisely to the 250 mL round bottom flask. The addition was continued for a period of 1 hour. After the addition, the reaction was continued further for a period of 12 hours. The reaction was worked up by addition of 40-50 mL of distilled water and both organic and aqueous layers were transferred into a separating funnel. The product was extracted with diethyl ether to obtain a yield of 9.2 g of a viscous liquid. The number average molecular weight analysis of the product by VPO showed a value of 1860. The number average degree of functionality was calculated as 62 mol %.

EXAMPLE-5

A two necked round bottom flask, fitted with a dropping funnel and reflux condenser was charged with 1.3 g (0.025 mol) of acrylonitrile and 70% $H_2SO_4$ (2 mL) at room temperature and temperature was increased to 75° C. Approximately 7.0 g (0.0025 mol) of liquid oligomer of poly(hexene-1) (Mn=2800) dissolved in 50 mL of chlorobenzene (as it was not free flowing liquid) was added drop wisely to the 250 mL round bottom flask. The addition was continued for a period of 1 hour. After the addition, the reaction was continued further for a period of 12 hours. The reaction was worked up by addition of 40-50 mL of distilled water and both organic and aqueous layers were transferred into a separating funnel. The product was extracted with diethyl ether to obtain a yield of 7.1 g of a viscous liquid. The number average molecular weight analysis of the product by VPO showed a value of 2860. The number average degree of functionality was calculated as 50 mol %.

EXAMPLE-6

A two necked round bottom flask, fitted with a dropping funnel and reflux condenser was charged with 0.65 g (0.0125 mol) of acrylonitrile and 70% $H_2SO_4$ (2 mL) at room temperature and temperature was increased to 75° C. Approximately 4.3 g.(0.001 mol) of liquid oligomer of poly(hexene-1) (Mn=4300) dissolved in 25 mL of chlorobenzene (as it was not free flowing liquid) was added drop wisely to the 250 mL round bottom flask. The addition was continued for a period of 1 hour. After the addition, the reaction was continued further for a period of 12 hours. The reaction was worked up by addition of 40-50 mL of distilled water and both organic and aqueous layers were transferred into a separating funnel. The product was extracted with diethyl ether to obtain a yield of 4.0 g. The number average molecular weight analysis of the product by VPO showed a value of 4340. The number average degree of functionality was calculated as 36 mol %.

EXAMPLE-7

A two necked round bottom flask, fitted with a dropping funnel and reflux condenser was charged with 0.65 g (0.0125 mol) of acrylonitrile and 70% $H_2SO_4$ (2 mL) at room temperature and temperature was increased to 75° C. Approximately 7.0 g (0.001 mol) of liquid oligomer of poly(hexene-1) (Mn=6900) dissolved in 50 mL of chlorobenzene (as it was not free flowing liquid) was added drop wisely to the 250 mL round bottom flask. The addition was continued for a period of 1 hour. After the addition, the reaction was continued further for a period of 12 hours. The reaction was worked up by addition of 40-50 mL of distilled water and both organic and aqueous layers were transferred into a separating funnel. The product was extracted with diethyl ether to obtain a yield of 6.9 g. The number average molecular weight analysis of the product by VPO showed a value of 6980. The number average degree of functionality was calculated as 33 mol %.

EXAMPLE-8

A two necked round bottom flask, fitted with a dropping funnel and reflux condenser was charged with 0.65 g (0.0125 mol) of acrylonitrile and 70% $H_2SO_4$ (2 mL) at room temperature and temperature was increased to 75° C. Approximately 10.0 g (0.001 mol) of liquid oligomer of poly(hexene-1) (Mn=10080) dissolved in 50 mL of chlorobenzene (as it was not free flowing liquid) was added drop wisely to the 250 mL round bottom flask. The addition was continued for a period of 1 hour. After the addition, the reaction was continued further for a period of 12 hours. The reaction was worked up by addition of 40-50 mL of distilled water and both organic and aqueous layers were transferred into a separating funnel. The product was extracted with diethyl ether to obtain a yield of 9.8 g. The number average molecular weight analysis of the product by VPO showed a value of 12280. The number average degree of functionality was calculated as 29 mol %.

We claim:

1. A process for the preparation of a N-poly(alkenyl) acrylamide of Formula (I)

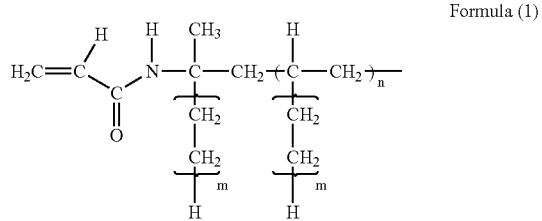

Formula (1)

wherein m=1-8, n=2-100, consisting of:
(a) mixing acrylonitrile and an acid catalyst at room temperature to obtain a mixture and
(b) increasing the temperature of the mixture followed by adding unsaturated poly(olefin) to obtain the N-poly (alkenyl) acrylamide
wherein the unsaturated polyolefin is a vinylidene terminated poly(α-olefin).

2. A process as claimed in claim 1 wherein the reaction is carried out in the absence of a solvent.

3. A process as claimed in claim 1 wherein the unsaturated polyolefin is reacted with acrylonitrile in the presence of an acid catalyst at a temperature in the range of 50-75° C., and using a solvent if the Mn of the unsaturated polyolefin is greater than 1000, and for a period in the range of 1-12 hours.

4. A process as claimed in claim 1 wherein the acid catalyst is selected from the group consisting of dilute sulfuric acid, dilute phosphoric acid, dilute hydrochloric acid and mixtures of concentrated sulfuric acid (98%) and acetic acid.

5. A process as claimed in claim 1 wherein a solvent is used if the Mn of the unsaturated polyolefin greater than 1000.

6. A process as claimed in claim 5 wherein the solvent is chlorobenzene.

7. A process as claimed in claim 1 wherein the N-poly (alkenyl) acrylamide is separated by filtration.

8. A process as claimed in claim 1 wherein the vinylidene terminated poly(α-olefin) is selected from the group consisting of poly(butene-1), poly(hexene-1), poly(octene-1), poly (decene-1), poly(dodecene-1) and poly(octadecene-1) and which are prepared by the polymerization of the corresponding α-olefin of the formula $C_mH_{2m}$ where m=4, 6, 8, 10 or 12.

9. A process as claimed in claim 1 wherein the poly(α-olefin) have a number average molecular weight in the range of 400 to 20000.

10. A process for the preparation of a N-poly(alkenyl) acrylamide of Formula (I)

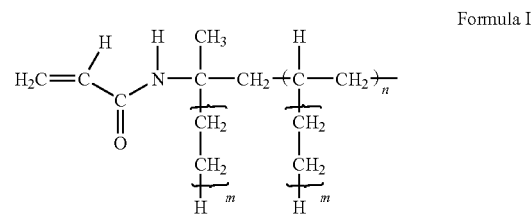

Formula I wherein m=1-8, n=4-100, consisting of reacting the corresponding unsaturated poly(olefin) with acrylonitrile in the presence of an acid catalyst to obtain the N-poly(alkenyl) acrylamide
wherein the N-poly(alkenyl) acrylamide is separated by filtration.

11. The process according to claim 10 wherein the reaction is carried out in the absence of a solvent.

12. The process according to claim 10 wherein the unsaturated polyolefin is a vinylidene terminated poly(α-olefin).

13. The process according to claim 10 wherein the unsaturated polyolefin is reacted with acrylonitrile in the presence of an acid catalyst at a temperature in the range of 50-75° C., and using a solvent if the Mn of the unsaturated polyolefin is greater than 1000, and for a period in the range of 1-12 hours.

14. The process according to claim 10 wherein the acid catalyst is selected from the group consisting of dilute sulfuric acid, dilute phosphoric acid, dilute hydrochloric acid and mixtures of concentrated sulfuric acid (98%) and acetic acid.

15. The process according to claim 10 wherein a solvent is used if the Mn of the unsaturated polyolefin greater than 1000.

16. The process according to claim 15 wherein the solvent is chlorobenzene.

17. The process according to claim 12 wherein the vinylidene terminated poly(α-olefin) is selected from the group consisting of poly(butene-1), poly(hexene-1), poly (octene-1), poly(decene-1), poly(dodecene-1) and poly(octadecene-1) and which are prepared by the polymerization of the corresponding α-olefin of the formula $C_mH_{2m}$ where m=4, 6, 8, 10 or 12.

18. The process according to claim 10 wherein the poly(α-olefin) have a number average molecular weight in the range of 400 to 20000.

* * * * *